United States Patent [19]

Kita

[11] Patent Number: 4,604,989
[45] Date of Patent: Aug. 12, 1986

[54] COOKING VESSEL
[75] Inventor: Toshiyuki Kita, Osaka, Japan
[73] Assignee: Hokusei Nikkei Household Utensils Co., Ltd., Takaoka, Japan
[21] Appl. No.: 703,432
[22] Filed: Feb. 20, 1985
[30] Foreign Application Priority Data Feb. 21, 1984 [JP] Japan .............................. 59-22464[U]

[51] Int. Cl.[4] .............................................. F24D 1/00
[52] U.S. Cl. ..................................... 126/369; 126/377; 99/413; 220/428
[58] Field of Search ............... 126/369, 377, 373, 350, 126/348, 20; 99/450, 413, 410; 134/135; 220/428

[56] References Cited

U.S. PATENT DOCUMENTS

| | | | |
|---|---|---|---|
| 194,224 | 8/1877 | Culbertson | 126/365 X |
| 475,435 | 5/1892 | Burnap | 126/369 |
| 1,462,275 | 7/1923 | Gammel | 126/369 |
| 4,106,486 | 8/1978 | Lee | 126/369 |
| 4,401,017 | 8/1983 | Feld | 126/365 X |

FOREIGN PATENT DOCUMENTS

| | | | |
|---|---|---|---|
| 382240 | 9/1923 | Fed. Rep. of Germany | 126/369 |
| 679954 | 9/1952 | United Kingdom | 126/377 |

Primary Examiner—Randall L. Green
Attorney, Agent, or Firm—Finnegan, Henderson, Farabow, Garrett & Dunner

[57] ABSTRACT

A cooking vessel having an inner container for containing a cooking material and an outer container for receiving the inner container with a circumferential space therebetween. The inner container is provided, on its bottom and side circumference with a large number of holes for connecting the inside areas of the inner and outer containers. The inner container also has openings for ejecting into the inner container foams produced when the cooking material is boiled.

10 Claims, 5 Drawing Figures

COOKING VESSEL

BACKGROUND OF THE INVENTION

1. Field of the Invention

The present invention relates to a cooking vessel, such as a pot or kettle, in particular a cooking vessel useful for boiling food such as spaghetti, macaroni, and other pasta.

2. Description of the Prior Art

In conventional pots, food, such as spaghetti, being boiled tends to foam, due mainly to protein dissolved from the food, and thus boil over. This can result in accidental extinguishment of the fire, particularly dangerous in the case of gas ranges, and increased danger of scalding. As a result, constant attention must be paid to the pots.

SUMMARY OF THE INVENTION

The primary object of the present invention is to provide a cooking vessel free from the aforementioned drawbacks.

In order to achieve the object mentioned above, according to the present invention, there is provided a cooking vessel including an inner container for holding a cooking material and an outer container for receiving the inner container with a circumferential space therebetween. The inner container is provided, on its bottom and side circumference, with a large number of holes for connecting the inside areas of the inner and outer containers. The inner container also includes means for ejecting therein foam produced when the cooking material is boiled.

Preferably, the outer container is substantially cylindrical in shape with a diameter increasing toward the bottom and has an upper edge. Also preferably, the inner container is substantially cylindrical in shape with a flanged top, which top can be located on the upper edge of the outer container.

BRIEF DESCRIPTION OF THE DRAWINGS

The invention will be described in detail below, with reference to the accompanying drawings, in which.

DESCRIPTION OF THE PREFERRED EMBODIMENTS

Figure 1:
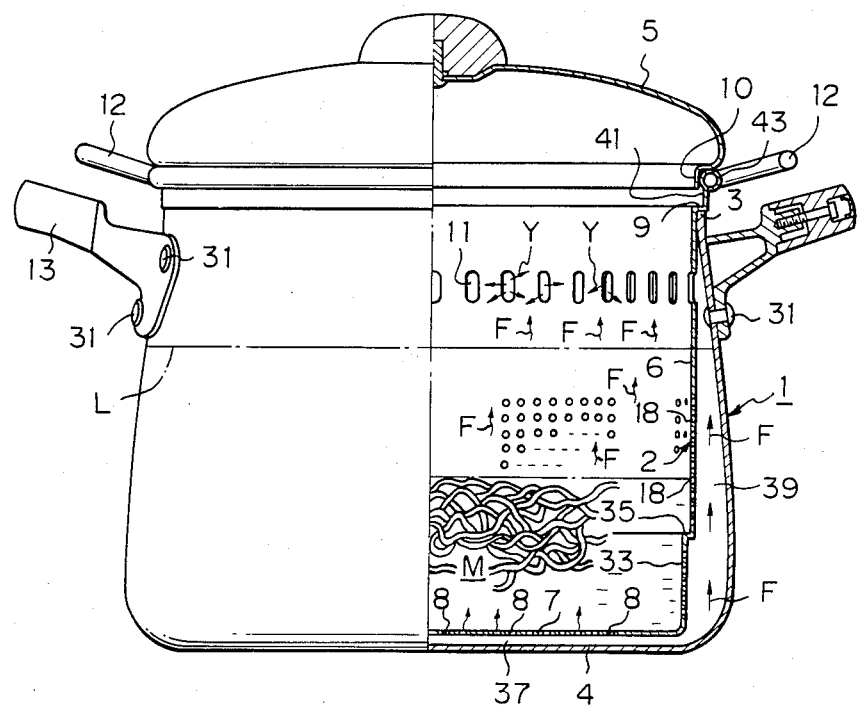
FIG. 1 is a partially sectioned front elevational view of a cooking vessel according to the present invention.

Below, a description will be given of a cooking pot as an embodiment of the invention. The invention, however, is not limited to a cooking pot and can apply to other cooking vessels as well.

The pot according to the present invention essentially includes an outer container 1 and an inner container 2. Seen from the top, the outer container 1 has a circular cross-section with a diameter increasing toward the bottom. Namely, the outer container 1 has an inner diameter which increases toward a bottom 4 from an upper edge 3. The outer container 1 has a relatively large depth. The outer container is made, for example, by a drawing process using aluminum alloy having a thickness of about 2.5 mm. The outer container preferably has two handles 13 which are rigidly connected to the body of the outer container 1, by means of, for example, screws or rivets 31 and which are located on diametrically opposite sides of the outer container 1.

The inner container 2 is located in the outer container 1. It has a circular cylindrical body 6 and a flat bottom plate 7. The cylindrical body 6 has a smaller diameter portion 33 in the vicinity of the bottom plate 7, so that a circumferential shoulder 35 can be provided between the large diameter portion 6 and the smaller diameter portion 33. When the inner container 2 is located in the outer container 1, there is a gap 37 between the bottom 4 of the outer container and the bottom plate 7 of the inner container 2. There is also a closed gap 39 between the inner circumference of the outer container 1 and the circumference of the inner container 2 in the lower part of the vessel due to the increasing diameter of the outer container 1 toward the bottom 4. The inner container 2 has a flanged upper end 41 which snugly fits with and over the upper edge 3 of the outer container 1.

The bottom plate 7 of the inner container 2 is provided with a large number of small bottom holes 8 which have a diameter small enough not to allow passage of the spaghetti or other food therethrough. A large number of small lateral holes 18 similar to the holes 8 are provided on the circumferential wall of the cylindrical body 6 of the inner container 2. The lateral holes 18 are small enough not to allow passage of the food therethrough. The lateral holes 18 are preferably distributed on the cylindrical body 6 below a water level L, to which the level of water (with food) in the pot, is usually limited. The lateral holes 18 can be uniformly distributed in the circumferential direction. Alternatively, groups 18G of lateral holes 18 can be provided on the circumference of the cylindrical body 6 of the inner container 2 at equidistant spaces.

A large number of larger lateral openings 11 are provided on the circumference of the cylindrical body 6 in the vicinity of the upper part of the latter, above the water level L that connect the upper part of the circumferential space with the inside areas of inner container 2. The lateral openings 11 are preferably aligned in a row extending along the circumference of the cylindrical body 6 of the inner body 2. It is also possible to divide each lateral opening 11 into several smaller lateral holes substantially identical to each lateral opening 11 in sectional area. The lateral openings 11 serve as passages for steam, foam, or the like, as will be apparent below.

The flanged upper end 41 of the inner container 2 has a bent top 43 which supports a lid 5 for the pot. When the lid 5 is located on the top 43 of the inner container 2, a downwardly extending projection 10 of the lid 5 is located in the top 43 of the inner container 2. It should be noted that the lid 5 is located not on the upper edge 3 of the outer container, but on the top 43 of the inner container 2. On the top 43 of the inner container 2 are provided outwardly projecting grips 12, which are preferably diametrically opposed to each other.

Figure 2:
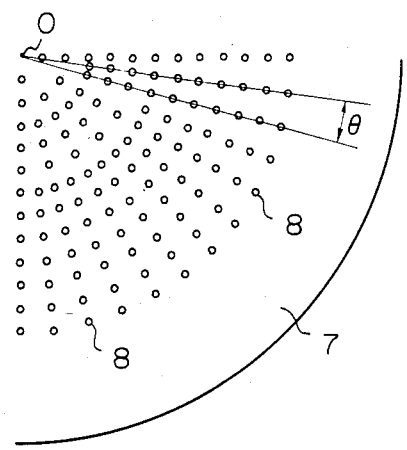
FIG. 2 is a partial plan view of a bottom plate of an inner container shown in FIG. 1.

FIG. 2 shows a quarter of the bottom plate 7 of the inner container 2. In the embodiment illustrated in FIG. 2, the small holes 8 are arranged along radii extending from the center 0 of the plate 7 at a pitch along $\theta$ of 7°30'. The holes 8 may be circular, but are not limited thereto. The holes 8 of the illustrated arrangement have a diameter of about 2 mm, which is too small to pass spaghetti or other food. The arrangement of the small holes 8 on the remaining three-fourths of the bottom plate 7 is similar to that shown in FIG. 2.

Figure 3:
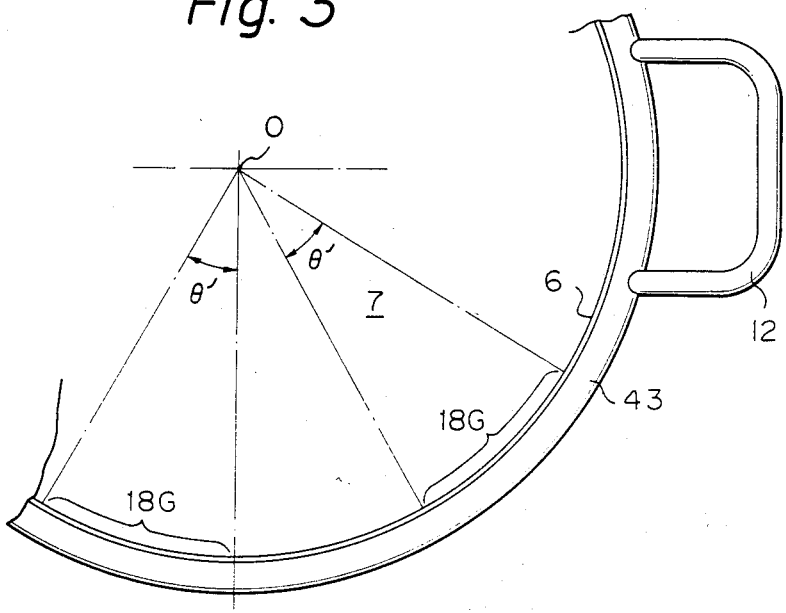
FIG. 3 is a partial schematic plan view of an inner container shown in FIG. 1.
Figure 4:
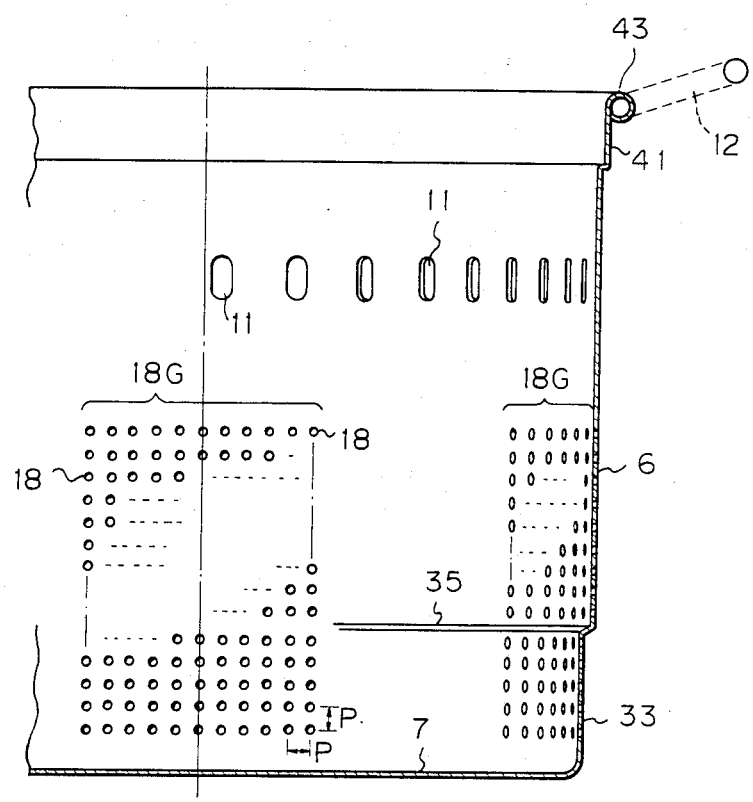
FIG. 4 is a partial longitudinal sectional front elevational view of an inner container shown in FIG. 1.
Figure 5:
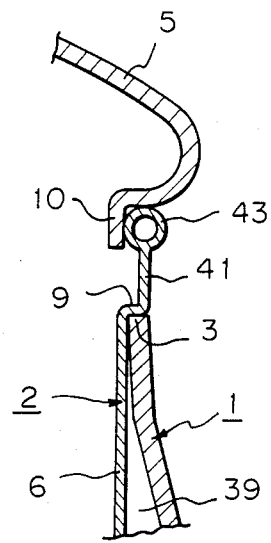
FIG. 5 is a partial enlarged sectional view of an upper portion of a cooking vessel according to the present invention.

As to the lateral holes 18, the groups 18G (FIG. 4) of lateral holes 18 are arranged on the circumference of the cylindrical body 6 of the inner container 2 at, for example, an angular pitch $\theta'$ of 30°, as shown in FIG. 3. Namely, six groups of holes 18 are arranged, one every 30°. The lateral holes 18 in the illustrated embodiment are circles having a diameter of about 2 mm. The holes 18 in each group 18G are spaced about 6 mm from one another (FIG. 4). The openings 11 are preferably of an elongated shape in the vertical direction, but are not limited thereto.

In the illustrated embodiment, the openings 11 have a width of about 4 mm and a length of about 12 mm. The openings can be uniformly distributed along the circumference of the inner container 2 at a constant pitch (e.g., 15 mm) or may be grouped, each group having a plurality of (e.g., five) openings 11 and each group being spaced from one another at a constant pitch (e.g., 45 mm). In the illustrated embodiment, the inner container has an inner diameter of 216 mm.

As mentioned before, when the inner container 2 is put in the outer container 1, the inner container 2 hangs from the upper edge 3 of the outer container 1, with the help of the annular flange 9 of the flanged upper end 41 of the inner container 2. Since the upper edge 3 and the annular flange 9 are both circular in shape in plan view and since the inner diameter of the upper edge 3 and the outer diameter of the cylindrical body 6 of the inner container 2 are substantially identical, the inner container 2 fits snugly into the upper edge 3 of the outer container 1. Namely, the upper portion of the cylindrical body 6 fits snugly with in the upper edge 3 of the outer container 1. On the other hand, the inner container 2 can be easily taken out from the outer container 1 when the inner container 2 is lifted by the grips 12. Preferably, the circular projection 10 of the lid 5 has an outer diameter identical to the outer diameter of the cylindrical body 6 and accordingly to the inner diameter of the circular upper edge 3 of the outer container 1, so that the lid 5 can be directly fit into the upper edge 3 of the outer container 1 when the inner container 2 is removed. The projection 10 of the lid 5 is usually fit into the bent top 43 of the inner container 2.

The circumferential shoulder 35 serves as a support on which an intermediate bottom plate (not shown), which has a perforated construction similar to the bottom plate 7, can be carried when the pot is used as a steamer. Namely, food to be steamed is put on the intermediate bottom plate which is located on the shoulder 35 of the inner container.

When boiling food M, such as spaghetti, in the pot, the food is placed in the inner container 2 and the inner container 2 is filled with water, for example, up to the level L. The water fills not only the inner container 2, but also the outer container 1, since the inner container 2 has a large number of bottom holes 8 and lateral holes 18. The pot is heated, and the water in the pot boils. Steam produced in the pot rises in the pot as shown by arrows F in FIG. 1.

When the contents of the pot boil to the extent of production of steam, the protein dissolved in the water begins to foam. This foaming occurs largely at the vicinity of the inner wall of the outer container 1, since the temperature is highest in that area. Although foaming also occurs in the inner container 2, it is rather small compared with that in the vicinity of the inner wall of the outer container 1. The foam successively produced in the space between the inner container 2 and the outer container 1 moves upwardly and is ejected through the openings 11 radially into the inner container 2, where it soon disappears. The foam (arrows Y) is ejected from the openings 11 at a high speed and acts to destroy the foam arising in the inner container 2.

As can be understood from the foregoing, the present invention results in a circulation of steam and foam from the space between the inner container 2 and the outer container 1 into the inner container 2. The circulation of the foam (and steam) becomes possible by the provision of the openings 11. The inventor has confirmed the ejection of foam from the openings 11 into the inner container 2 at a rather high speed and the subsequent disappearance of the foam in the inner container 2.

After boiling is completed, the lid 5 is removed and the inner container 2 is taken out. The grips 12 enable the inner container 2, which contains the boiled food, to be easily removed from the outer container 1. Due to the holes, the inner container 2 obviously also serves as a sieve for draining the food.

When removing the inner container 2 from the outer container 1, the outer container 1 does not interfere with the movement of the inner container 2 even if the inner container 2 is inclined with respect to the outer container 1, because of the presence of the space between the inner container 2 and the outer container 1. It is also possible to provide the space 39 between the inner and outer containers by a straight cylindrical outer container 1 and cylindrical inner container 2 which tapers in diameter toward the bottom.

The vessel according to the invention can also be used as a regular pot, such as a stew pot, by removing the inner container 2. When the inner container 2 is removed, the lid 5 can be directly put on the upper edge 3 of the outer container 1, as mentioned before, since the projection 10 of the lid 5 closely fits in the upper edge 3 of the outer container.

The cooking vessel of the present invention is useful not only for domestic use but also for industrial use.

I claim:

1. A cooking vessel comprising an inner container for holding a cooking material and an outer container for receiving the inner container, said inner and outer containers being sized to provide a circumferential space therebetween in the lower part of the vessel but that fit snugly together in the upper part of the vessel, said inner container being provided on its bottom and lower side circumference with a large number of holes for connecting the inside areas of the inner and outer containers and also being provided with a plurality of vertically elongated openings, relatively larger than said holes, spaced circumferentially around the upper part of the inner container above the normal level of water used in the vessel that connect the upper part of the circumferential space between the containers with the inside area of the inner container whereby foam produced in the circumferential space by the cooking material when it is boiled passes upwardly in the space and through said elongated openings at a relatively high rate of speed into the inner container to prevent boiling over of the vessel.

2. The cooking vessel of claim 1, wherein said outer container is substantially cylindrical in shape with a diameter increasing toward the bottom thereof and has an upper edge.

3. The cooking vessel of claim 2, wherein said inner container is substantially cylindrical in shape with a flanged top, which top can be located on the upper edge of the outer container.

4. The cooking vessel of claim 3, wherein said upper edge of the outer container has an inner diameter which is substantially identical to an outer diameter of the corresponding upper portion of the inner container that comes into contact with the upper edge of the outer container.

5. The cooking vessel of claim 4, further comprising a lid which has a circumferential projection which can be fit into the flanged top of the inner container.

6. The cooking vessel of claim 5, wherein said projection of the lid has an outer diameter which is substantially identical to the inner diameter of the upper edge of the outer container.

7. The cooking vessel of claim 3, wherein said inner container has a stepped shoulder portion on a lower portion thereof.

8. The cooking vessel of claim 1, further comprising a lid which can be located on the inner container.

9. The cooking vessel of claim 1, further comprising grips on the inner container for gripping the latter to remove it from the outer container.

10. The cooking vessel of claim 1, wherein said elongated openings are aligned horizontally around the circumference of the inner container.

* * * * *